United States Patent [19]

Backus et al.

[11] Patent Number: 5,010,740
[45] Date of Patent: Apr. 30, 1991

[54] REFRIGERATION SYSTEM WITH MASS FLOW LIMITING DEVICE

[75] Inventors: Robert J. Backus, Dewitt; Robert A. Chopko, Liverpool; Alan S. Drucker, Dewitt; Chester D. Ripka, Syracuse, all of N.Y.

[73] Assignee: Carrier Corporation, Syracuse, N.Y.

[21] Appl. No.: 475,566

[22] Filed: Feb. 7, 1990

[51] Int. Cl.$^5$ .................. F25B 41/04; D03D 39/10
[52] U.S. Cl. .................. 62/217; 137/503; 137/508; 138/45
[58] Field of Search .................. 137/503, 508, 517; 62/217; 138/45

[56] References Cited

U.S. PATENT DOCUMENTS

| | | | |
|---|---|---|---|
| 1,997,404 | 4/1935 | Hamilton | 137/508 X |
| 2,633,868 | 4/1953 | Berhoudar | 137/503 X |
| 2,766,593 | 10/1956 | Mitchell et al. | 62/217 |
| 3,138,174 | 6/1964 | Gilpin | 137/503 X |
| 3,431,944 | 3/1969 | Sakuma | 137/508 X |

Primary Examiner—William E. Wayner
Attorney, Agent, or Firm—David J. Zobkiw

[57] ABSTRACT

A closed refrigeration system is provided with a mass flow limiting device located upstream of the suction inlet of a compressor. The device limits the mass flow supplied to the compressor during pulldown and startup to prevent overloading the motor or engine driving the compressor but has minimal influence on the refrigeration system under equilibrium conditions since it is designed for the specific system parameters.

7 Claims, 3 Drawing Sheets

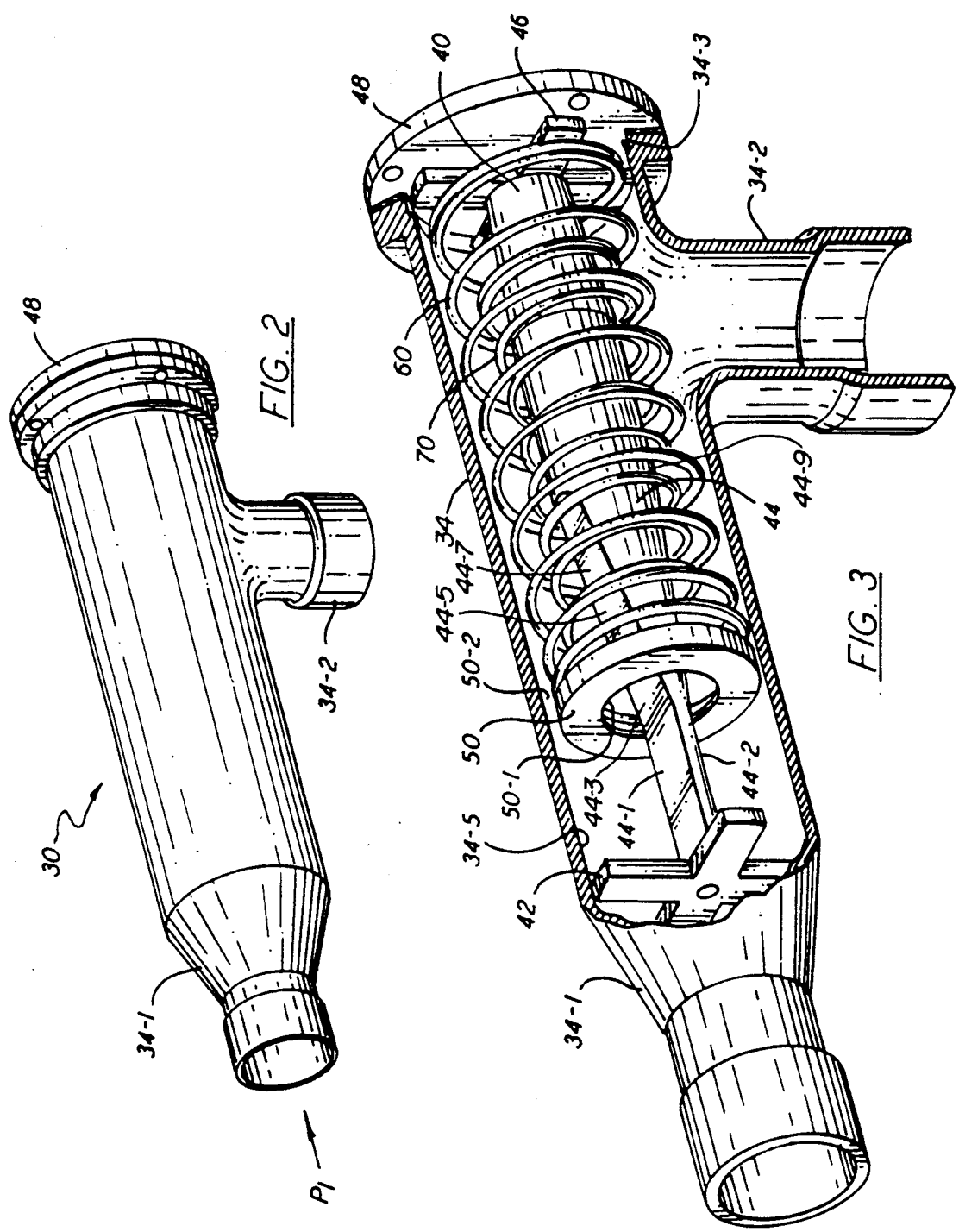

REFRIGERATION SYSTEM WITH MASS FLOW LIMITING DEVICE

BACKGROUND OF THE INVENTION

In its simplest form a closed refrigeration system, such as is used in transport refrigeration equipment, serially includes a compressor, a discharge line, a condenser, an expansion device, an evaporator and a suction line connected to the compressor. In such a system, the mass flow, which is generally proportional to the suction, pressure, is indicative of the compressor power requirements. In normal operation, the suction gas is in the form of a low pressure superheated vapor and its state is dependent upon a number of factors such as ambient temperature, the temperature being maintained and whether the system has reached equilibrium or is still being pulled down. At startup, the suction gas may be at ambient temperature and even partially condensed in the evaporator and suction line. Under these conditions, and especially during conditions of pulldown, the mass flow of refrigerant drawn into the compressor and subsequently compressed is much greater than it would be in an equilibrium situation. This greater mass flow results in significantly increased power requirements. During operation, the mass flow rate will change with ambient temperature and other variations in the heat load on the space being refrigerated such as the exposure of a refrigerated cargo container to sun load.

Refrigeration systems that see a wide variation in air temperatures over the condenser and evaporator coils experience a correspondingly large variation in suction pressure and mass flow rate of the refrigerant, resulting in a wide variation in the power requirements of the compressor. A transport refrigeration system is an example of this. Cargo requirements can range from 55° F. for bananas to −20° F. for ice cream, and ambient temperatures can range from −20° F. to 120° F. There are, in addition, operating factors such as having to pull down the temperature of cargo loaded at a temperature greater than the desired setpoint, and size and weight limitations on the system components, which result in instances where the mass flow rate and pressure of the suction gas returning to the compressor, if not regulated, would overload the engine which drives the compressor.

SUMMARY OF THE INVENTION

A properly designed mass flow limiting device is located in the compressor suction line of a refrigeration system. Proper design requires consideration of the desired limits of suction pressure and mass flow as well as the type of refrigerant being used. The device includes a variable flow restriction whose position is responsive to the differential fluid pressure across the restriction plus a spring bias. Movement of the variable flow restriction achieves a relatively constant downstream pressure and thereby limits the mass flow. However, the variable flow restriction only changes the cross section of the flow path after a predetermined pressure drop is achieved.

It is an object of this invention to prevent overloading the engine or motor which drives the compressor of a refrigeration system. It is a further object of this invention to permit the use of an engine or motor that would otherwise be inadequate for the power requirements of the system under the conditions of startup and pulldown.

It is another object of this invention to limit the maximium flow of refrigerant returning to the compressor under those system conditions which would otherwise result in excessive power required from the engine or omotor. These objects, and others as will become apparent hereinafter, are accomplished by the present invention.

Basically, the mass flow of suction gas supplied to the inlet of the compressor of a refrigeration system is limited to prevent overloading the engine or motor which powers the compressor. Since the mass flow is generally proportional to the pressure of the gas, an increase in the suction pressure upstream of the device beyond a predetermined value tends to cause it to move to a position restricting the flow and this movement is opposed by the suction pressure downstream of the device plus a spring bias. This coaction maintains a relatively constant suction pressure downstream of the device thereby limiting the mass flow.

BRIEF DESCRIPTION OF THE DRAWINGS

For a fuller undrstanding of the present invention, reference should now be made to the following detailed description thereof taken in conjunction with the accompanying drawings wherein:

FIG. 2 is an isometric view of the mass flow limiting device;

FIG. 3 is a partially cutaway isometric view of the mass flow limiting device;

DESCRIPTION OF THE PREFERRED EMBODIMENTS

Figure 1:
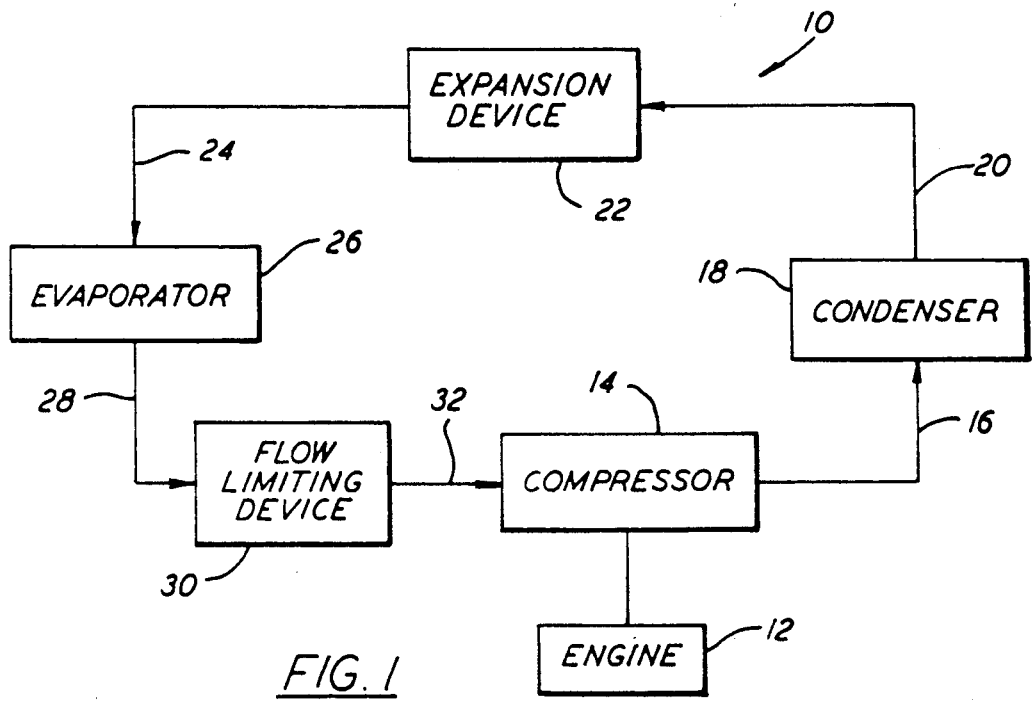
FIG. 1 is a schematic diagram of a refrigeration system employing the present invention.

In FIG. 1, the numeral 10 generally designates a refrigeration system such as a truck/trailer unit driven by an internal combustion engine 12. Driven by engine 12, compressor 14 compresses the refrigerant thereby raising its temperture and pressure and forcing the refrigerant to flow through discharge line 16 to condenser 18 where the refrigerant is forced into the condenser tubes (not illustrated). Heat is removed from the refrigerant in the condenser 18, and the refrigerant liquifies. The high temperature, high pressure liquid refrigerant flows via line 20 to expansion device 22 such as a thermostatic expansion valve which reduces the pressure of the liquid refrigerant and meters the flow of liquid refrigerant to evaporator 26 via line 24. The reduction in pressure in expansion device 22 is accompanied by a drop in temperature so that the low temperature, low pressure liquid refrigerant supplied to the evaporator 26 is colder than the air circulated over the evaporator tubes (not illustated). Thus, heat is removed from the air circulated over the evaportor 26 and the resultant cold air is circulated, for example, throughout a box to maintain the cargo at the desired temperature. The transfer of heat from the air to the low temperature refrigerant is the evaporator 26 causes the liquid refrigerant to vaporize. The resultant low temperature, low pressure superheated vapor refrigerant is supplied via line 28 to compressor 14. According to the teachings of the present invention, a flow limiting device 30 is placed in the line between evaporator 26 and compressor 14, and is connected thereto via lines 28 and 32, respectively.

The function of flow limiting device 30 is to limit the mass flow of refrigerant to compressor 14 to prevent the overloading of engine 12 during those conditions in which excessively high mass flow rates would otherwise result. Overloading is the result of compressing more mass of refrigerant per stroke of the compressor than the compressor and its power source are designed to handle. However, under equilibrium conditions the flow limiting device 30 should have minimal influence on the system 10 since it is designed for the correct response for the refrigerant used and specific system parameters.

Figure 4:
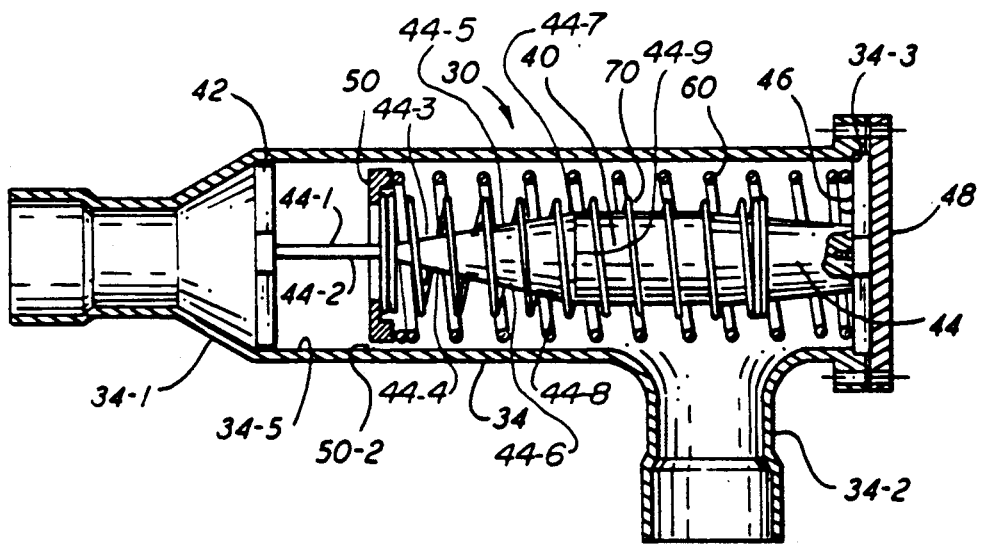
FIG. 4 is a sectional view of the mass flow limiting device.
Figure 5:
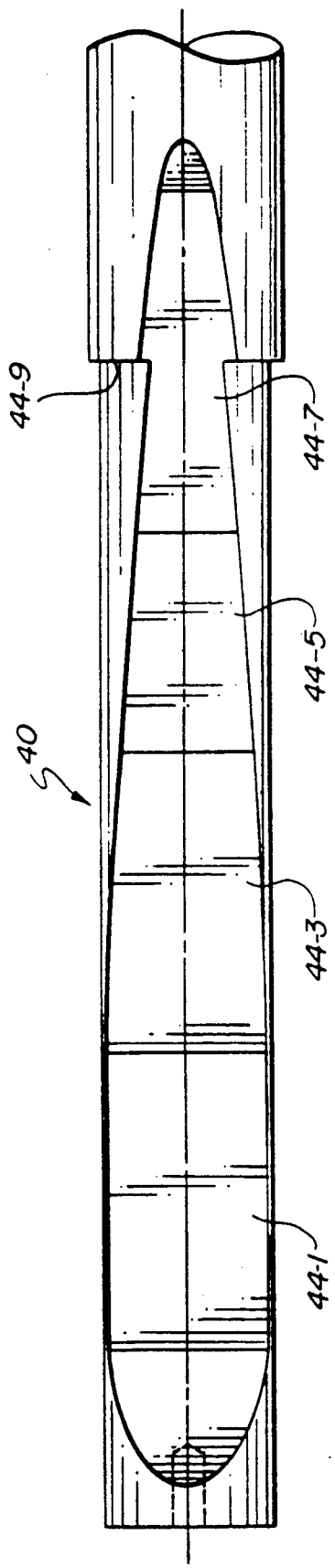
FIG. 5 is a top view of a portion of the central member.
Figure 6:
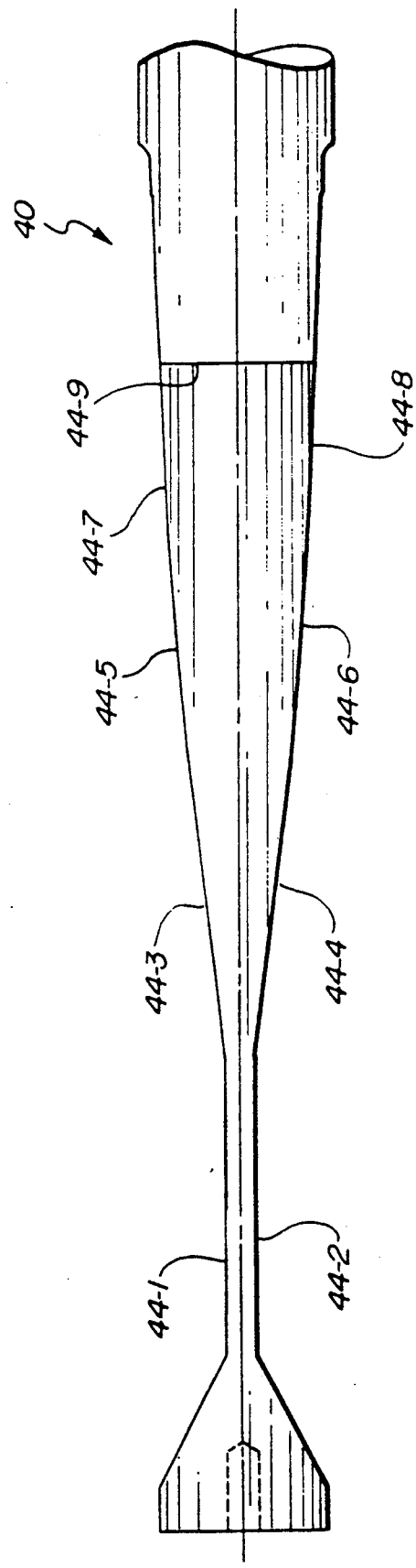
FIG. 6 is a side view of a portion of the central member.

Referring now to FIG. 2-4, flow limiting device 30 includes a generally cylindrical housing portion 34 having a frustoconical transition portion 34-1 adapted to be connected to line 28 and a side passage 34-2. Within cylindrical housing portion 34 and co-extensive therewith is a central member 40 having upstream and downstream cruciform end pieces 42 and 46, respectively, integral with elongated axial member 44 which is located in cylindrical housing portion 34 by end pieces 42 and 46. Specifically, a shoulder 34-3 is formed in housing 34 and coacts with the ends of the arms of cruciform end piece 46 and end plate 48 to secure central member 40 axially and radially in bore 34-5 of housing 34. Cruciform end piece 42 serves to keep annular member 50 on central member 40 and helps to maintain central member 40 centered in bore 34-5. Elongated axial member 44 is of a varying cross section in the axial direction with the cross section being the least at the upstream portion and then increasing in the downstream direction for at least a portion of its length. In the preferred embodiment illustrated, axial member 44 is generally cylindrical with two symmetrically located uniform portions 44-1 and 44-2 formed therein at the upstream end and multiple symmetrical tapering portions 44-3 through 44-8 formed downstream of uniform portions 44-1 and 2 as is best shown in FIGS. 5 and 6. Referring specifically to FIG. 6, it will be noted that the uniform portions 44-1 and 2 transition into tapering portions 44-3 and 44-4, respectively, and these, in turn transition into tapering portions 44-5 and 6, respectively, which have a different taper. Similarly, tapering portion 44-5 and 6 transition into tapering portions 44-7 and 8, respectively, which have a different taper. Annular member 50 is located on axial member 44 with coiled spring member 60 located on axial member 44 between annular member 50 and end piece 46. Spring member 60 normally biases annular member 50 so as to cause it to be located at or near the upstream end of cylindrical housing portion 34 to the extent permitted by end piece 42 and/or the unstressed length of spring member 60 so that the resulting flow area defined by opening 50-1 and member 44 is relatively large due to the uniform portions 44-1 and 2. A second spring 70 is located on axial member 44 but is of a shorter length than spring 60. As illustrated in FIGS. 3 and 4, the annular member 50 engages second spring 70 in the vicinity of the transition from uniform portions 44-1 and 2 to tapering portions 44-3 and 4. In addition to the flow area defined by opening 50-1 and member 44, there is a second annular flow area 50-2 defined between the outer circumference of annular member 50 and the inner surface of bore 34-5.

In operation, the upstream portion of annular member 50 is acted on upon the pressure in line 28 which represents the pressure of the suction gas available to be supplied to the suction side of the compressor 14. The downstream portion of annular member 50 is acted upon by the pressure in line 32 which is the actual pressure of the gas supplied to the suction side of the compressor 14 plus the bias force of spring 60. At any given position of annular member 50 on axial member 44, if changes to the system 10 cause an increase in the upstream pressure and mass flow rate, then the pressure differential across the flow areas defined by openings 50-1 and 50-2 will increase. As the pressure differential increases, the annular member 50 moves downstream in opposition to the bias of spring 60 which increases as it compresses until a balance is again reached. When spring 60 compresses sufficiently, spring 70 will be engaged and contact both annular member 50 and end piece 46 so that there will be a different spring rate for further pressure differential increases. As the annular member 50 moves downstream, the opening 50-1 initially coacts with uniform portions 44-1 and 2 so that the cross sectional area of the flow path through opening 50-1 remains constant until the opening 50-1 coacts with tapering portions 44-3 and 4 so as to decrease the flow area which reduces the flow as well as increases the pressure differential across member 50. As opening 50-1 coacts with different ones of the tapering portions 44-3 through 44-8, the response changes due to the change in the angles of slopes of tapering portions 44-3 through 44-8. The multiple tapering portions more closely maintain a constant suction pressure downstream of the device. In addition, a stop 44-9, in the nature of a shoulder, is incorporated into axial member 44 to limit the downstream movement of annular member 50 to prevent compressing springs 60 and 70 beyond their elastic limits. As best shown in FIG. 5, it will be noted that annular member 50 would engage stop 44-9 prior to the reaching of the downstream ends of tapering sections 44-7 and 44-8. As the device adjusts, the pressure in line 28 will gradually reduce permitting annular member 50 to move upstream to increase the flow area, thus permitting refrigeration system 10 to reach a state of equilibrium with optimal power consumption.

Although the present invention has been described in terms of an internal combustion engine driven system, it is equally applicable to an electric or dual powered system. Also, the bias on member 50 may be provided by any suitable device which provides a force proportional to the displacement of member 50 with respect to member 44. It is therefore intended that the present invention is to be limited only by the scope of the appended claims.

What is claimed is:

1. A closed refrigeration system containing refrigerant comprising:
   compressor means for compressing said refrigerant and including an inlet and an outlet;
   means for driving said compressor means;
   said closed refrigeration system defining a refrigerant circuit whereby said refrigerant compressed by said compressor means passes from said outlet serially through condenser means, expansion means, evaporator means and flow limiting means before returning to said compressor means via said inlet;
   said flow limiting means including:

a housing having an inlet connected to said evaporator means, an outlet connected to said compressor and with a flow path connecting said inlet and said outlet of said housing;

an elongated member axially located in said flow path and serially having a fixed cross section portion and a variable cross section portion in an axial downstream direction with said variable cross section portion increasing in going from said inlet of said housing towards said outlet of said housing for at least a portion of the length of said elongated member;

annular means in said housing having an aperture receiving said fixed and variable cross section portions of said elongated member and coacting therewith to define a flow path;

biasing means acting on said annular means to bias said annular means towards said inlet of said housing whereby refrigerant entering said housing passes through said flow path defined by said aperture and said elongated member creating a differential pressure across said annular means tending to move said annular means in a downstream direction towards said outlet of said housing to restrict said flow path defined by said annular means and said variable cross section portion of said elongated member in opposition to said biasing means so that said inlet of said compressor is always supplied with refrigerant at an essentially constant pressure when said annular means is coacting with said variable cross section portion.

2. The closed refrigeration system of claim 1 wherein said biasing means includes a plurality of springs with at least one of said plurality of springs providing a bias to said annular means only after a predetermined movement of said annular means.

3. The closed refrigeration system of claim 1 further including a second annular flow path defined between said annular means and said housing.

4. The closed refrigeration system of claim 1 wherein said variable cross section portion has a plurality of tapering portions having different tapers.

5. A flow limiting means for maintaining an essentially constant downstream pressure comprising:
a housing having an inlet and an outlet and a flow path connecting said inlet and said outlet of said housing;
an elongated member axially located in said flow path and serially having a fixed cross section portion and a variable cross section portion in an axial downstream direction with said variable cross section portion increasing in going from said inlet to said outlet for at least a portion of the length of said elongated member;
annular means in said housing having an aperture receiving said fixed and variable cross section portions of said elongated member and coacting therewith to define a flow path;
biasing means acting on said annular means to bias said annular means towards said inlet of said housing; and
said biasing means including a plurality of spring means to provide different spring rates over different ranges of movement of said annular means whereby fluid entering said inlet passes through said flow path defined by said aperture and said elongated member and creates a differential pressure across said annular means tending to move said annular means in a downstream direction towards said outlet of said housing to restrict said flow path defined by said annular means and variable cross section portion of said elongated member in opposition to said biasing means so that an essentially constant pressure is maintained downstream of said annular means when said annular means is coacting with said variable cross section portion.

6. A flow limiting means for maintaining an essentially constant downstream pressure comprising:
a housing having an inlet and an outlet and a flow path connecting said inlet and said outlet of said housing;
an elongated member axially located in said flow path and serially having a fixed cross section portion and a variable cross section portion in an axial downstream direction with said variable cross section portion increasing in going from said inlet to said outlet for at least a portion of the length of said elongated member;
annular means in said housing having an aperture receiving said fixed and variable cross section portions of said elongated member and coacting therewith to define a flow path;
a second annular flow path defined between said annular means and said housing;
biasing means acting on said annular means to bias said annular means towards said inlet of said housing whereby fluid entering said inlet passes through said flow path defined by said aperture and said elongated member and creates a differential pressure across said annular means tending to move said annular means in a downstream direction towards said outlet of said housing to restrict said flow path defined by said annular means and said variable cross section portion of said elongated member in opposition to said biasing means so that an essentially constant pressure is maintained downstream of said annular means when said annular means is coacting with said variable cross section portion.

7. A flow limiting means for maintaining an essentially constant downstream pressure comprising:
a housing having an inlet and an outlet and a flow path connecting said inlet and said outlet of said housing;
An elongated member axially located in said flow path and serially having a fixed cross section portion and a variable cross section portion in an axial downstream direction with said variable cross section portion having a plurality of tapering portions having different tapers and increasing in going from said inlet to said outlet for at least a portion of the length of said elongated member;
annular means in said housing having an aperture receiving said fixed and variable cross section portions of said elongated member and coacting therewith to define a flow path;
biasing means acting on said annular means to bias said annular means towards said inlet of said housing whereby fluid entering said inlet passes through said flow path defined by said aperture and said elongated member and creates a differential pressure across said annular means tending to move said annular means in a downstream direction towards said outlet of said housing to restrict said flow path defined by said annular means and said variable cross section portion of said elongated member in opposition to said biasing means so that an essentially constant pressure is maintained downstream of said annular means when said annular means is coacting with said variable cross section portion.

* * * * *